United States Patent [19]
Takeuchi

[11] 3,818,530
[45] June 25, 1974

[54] BRUSH SUPPORTING DEVICE FOR A CAR WASHER
[75] Inventor: Shigeo Takeuchi, Nagoya, Japan
[73] Assignee: Takeuchi Tekko Kabushiki Kaisha, Nagoya-shi, Japan
[22] Filed: Mar. 9, 1973
[21] Appl. No.: 339,600

[30] Foreign Application Priority Data
May 19, 1972 Japan................ 47-49716

[52] U.S. Cl. .................. 15/21 D, 15/DIG. 2
[51] Int. Cl. .......................................... B60s 3/06
[58] Field of Search............. 15/DIG. 2, 21 D, 21 E, 15/53

[56] References Cited
UNITED STATES PATENTS
3,614,800 10/1971 Takeuchi........................... 15/21 E
3,638,265 2/1972 Fuhring.............................. 15/21 D Primary Examiner—Edward L. Roberts
Attorney, Agent, or Firm—Eric H. Waters

[57] ABSTRACT

A brush supporting device for a car washer adapted to wash vehicles of varying sizes, including a support arm structure with a car-washing brush, motion transmitting wheels and an overspeed transmission mechanism connected between the wheels. The device effects a compound pivoting motion to the brush-supporting arm to adapt motion thereof to the size of the vehicle being washed.

1 Claim, 2 Drawing Figures 3,818,530

BRUSH SUPPORTING DEVICE FOR A CAR WASHER

BACKGROUND OF THE INVENTION

This invention pertains to car washers adapted to automatically wash the body surfaces of vehicles such as passenger cars and, more particularly, to means for operatively supporting the brush assembly in such car washers in a manner whereby the top, side and rear surfaces of the car body may be consecutively washed in an efficient and automatic manner.

DISCUSSION OF THE PRIOR ART

Usually, in car washers, a rotary side brush unit is carried by an arm which is pivotally secured to the washer frame for effecting rocking movement in a horizontal plane, and which is engageable with a car body so as to follow the contour thereof, thereby causing the brush carrying arm to rock or swing outwardly as either the vehicle or the washer frame move relative to each other. On the other hand, vehicles of different sizes ordinarily have widths varying over a wide range and this has previously caused numerous complications in use and design of car washers. In other words, in cases where the brush carrying arm is designed with a length appropriate for the washing of large-sized vehicles, the side brush unit, carried on such an arm, may not come into effective contact with the body of small-sized vehicles, thereby making it very difficult to wash such vehicles. Conversely, if the brush arm is designed with a length appropriate for the washing of small-sized vehicles, the arm may not be rocked outwardly to any sufficient extent when a larger vehicle is washed, involving the danger that the side brush may be caught on the front surface of the vehicle body and damage the vehicle, or the brush assembly and associated parts of the car washer.

SUMMARY OF THE INVENTION

In view of these difficulties which have previously been encountered, the present invention has for its object the provision of a novel brush supporting device for a car washer which is particularly adapted to support a brush unit in a manner so that the latter may make contact with the vehicle body in a most effective position relative thereto so as to wash the vehicle body, and particularly the side surface thereof, in an efficient manner regardless of the size of the vehicle.

According to the present invention, a brush supporting device for a car washer is provided which comprises a support arm pivotally mounted on the washer frame, a shaft journaled in the free end of the support arm, a brush carrying arm integrally formed with the shaft and extending laterally therefrom, a washing brush suspended from the free end of the brush carrying arm, another motion-transmitting wheel fixedly mounted on the shaft, a motion-transmitting wheel fixedly mounted on the washer frame in axial alignment with the pivotal axis of said support arm, and an overspeed transmission mechanism arranged between the motion-transmitting wheels so as to cause the support arm to rock with the rocking movement of the brush carrying arm at a speed higher than that of the latter.

BRIEF DESCRIPTION OF THE DRAWINGS

The present invention will now be described with reference to the accompanying drawings, which illustrate one preferred embodiment of the invention and in which.

DESCRIPTION OF THE PREFERRED EMBODIMENT

Figure 1:
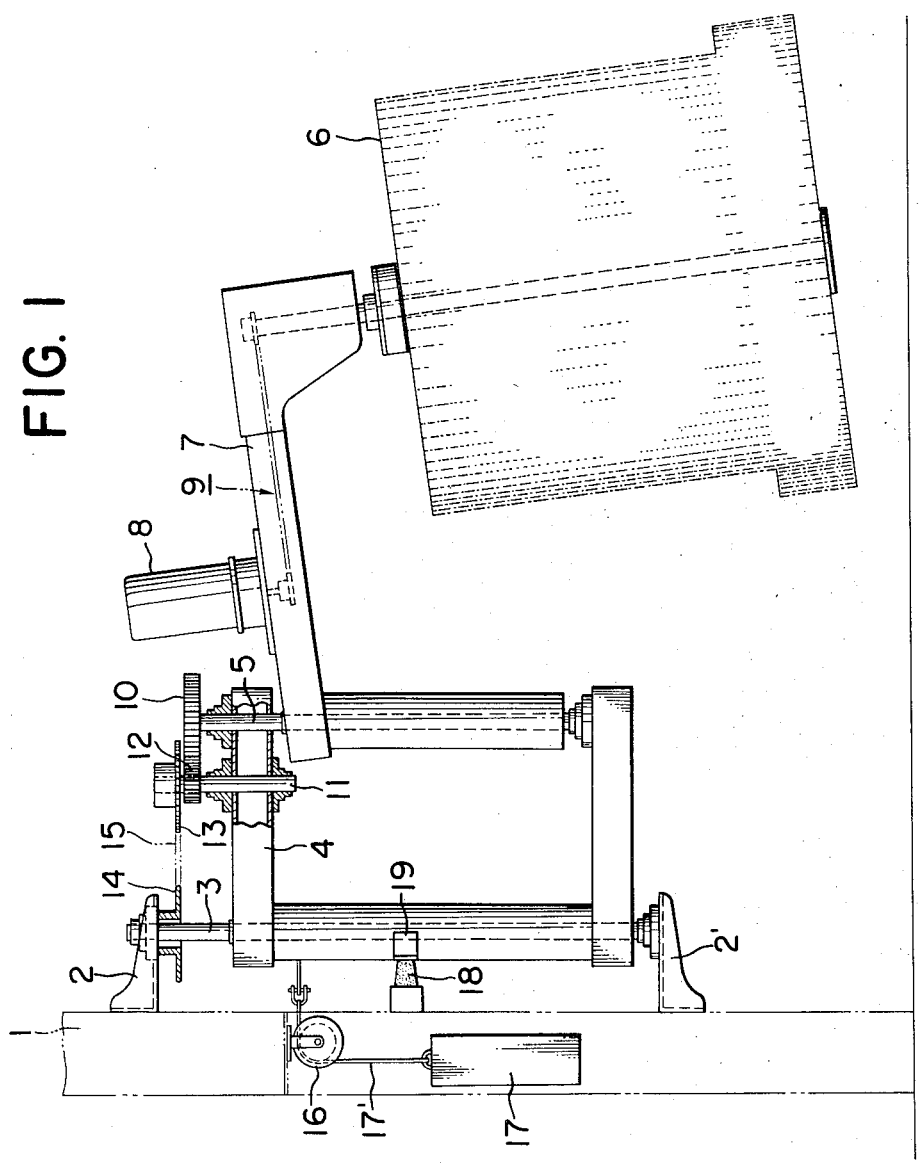
FIG. 1 is a side elevational view, partly in section, of a device embodying the present invention.

Referring to the drawings, reference numeral 1 indicates a portal frame of a car washer having a pair of brackets 2 and 2' secured to one side of the portal frame in vertically spaced relation to each other, and a support shaft 3 rotatably supported by the brackets 2 and 2' through the medium of appropriate bearings.

Secured to the support shaft 3 is a support arm 4 which is generally U-shaped, including a pair of spaced parallel arm members extending laterally from the columnar portion interconnecting the members. A vertical shaft 5 is journaled in the free or distal end of such support arm 4 by appropriate bearing means which are arranged on the respective arm members, at the free end thereof. A brush carrying arm 7 is rigidly secured at its basal end to the vertical shaft 5 intermediate the ends thereof and includes a side brush unit 6 suspended from the distal end of arm 7. A drive mechanism 9 is arranged on the arm 7 adapted to rotate the side brush 6 about its own axis and includes a drive motor 8 mounted on the arm 7, and a belt transmission 9 which is arranged therein.

A motion-transmitting gear wheel 10 is fixedly mounted on the vertical shaft 5 at the top end thereof and another motion-transmitting sprocket gear wheel 14 is fixed to the upper bracket 2 in axial alignment with the axis of the support shaft 3 so as to be supported by the upper and lower brackets 2 and 2'. The motion-transmitting wheels 10 and 14 are interconnected by an overspeed mechanism which, in the illustrated embodiment, includes the following components. First, an overspeed gear 12 is secured to an intermediate shaft 11 journaled in the support arm 4 in a position adjacent the vertical shaft 5 which has been, previously described, and is in meshing engagement with the motion-transmitting gear 10 on the shaft 5. Also, secured to the intermediate shaft 11 is a chain sprocket wheel 13 which is chain-connected with the motion-transmitting chain sprocket wheel 14, which is fixed as previously described.

Figure 2:
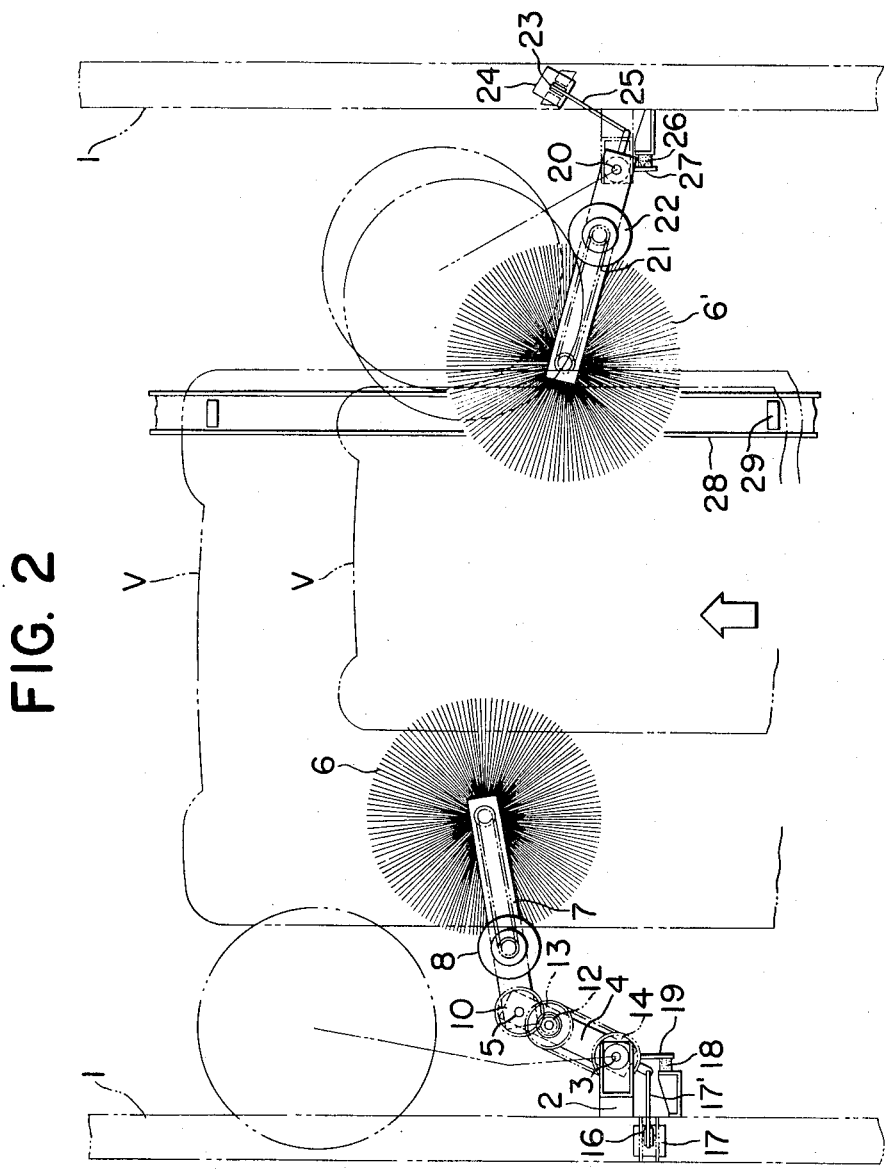
FIG. 2 is a plan view of the device showing the manner in which the device operates.

A flexible cable 17' is secured at one end to the support arm 4 on the back side of the columnar basal portion thereof. The cable 17' extends downwardly around a pulley 15 which is rotatably mounted on an adjacent portion of the washer frame 1, and which has a counterbalancing weight 17 secured to the bottom end of cable 17'. It is noted that the cable 17' serves to bias the support arm 4 clockwise as viewed in FIG. 2. Further, a projection 19 is formed on the back of the support arm 4 for engagement with a stop 18 which is arranged on the washer frame 1. It is to be understood that under the biasing effect of cable 17' carrying weight 17, the support arm 4 is normally held in a position indicated by the solid lines in FIG. 2, thereby keeping the side brush 6 in a position extended inwardly of the washer frame 1 in preparation for effecting a washing operation.

Reference numeral 6' indicates another side brush unit which is supported on the other side of the washer frame 1 in a position opposite to the above described side brush unit 6 by means of standard type of a support mechanism, which includes a brush carrying arm 21 rockably mounted on a vertical shaft 20 and arranged on the other side of the washer frame 1. A motor 22 is mounted on the arm 21 and is adapted to drive the side brush 6, which is supported on the arm 21 at the free end thereof. As in the case of the previously described support arm 4, a cable 25 is secured to the brush arm 21 at the basal end thereof and extends downwardly around a pulley 23 mounted on the washer frame 1, with a counterbalancing weight 24 being secured to the bottom end of the cable 25. Also, secured to the brush arm 21 at the basal end thereof, is a projection 27 for cooperation with a stop 26 which is secured to the frame 1.

Reference numeral 28 (FIG. 2) indicates a guide rail which is positioned on the ground and which extends through the portal frame 1 in an offset position toward that side of the frame on which the side brush 6' is arranged. Reference numeral 29 indicates a conveyor arranged to run along the guide rail 28 for moving the vehicle which is to be washed through the car washer.

Description will now be made of the operation of the illustrated brush supporting device. Assuming that a vehicle V, is moved in the direction indicated by the arrow in FIG. 2, along the guide rail 28, the side brush 6 is engaged by the front or side surface of the body of the vehicle V and thus is pushed forwardly causing the brush carrying arm 7 and its shaft 5 to rotate in a counterclockwise direction as viewed in FIG. 2, with the result that the intermediate shaft 11 is driven so as to turn clockwise about its own axis at an increased speed through the medium of overspeed gear 12, which is in mesh with the gear 10 fixed to the shaft 5. The turning movement of the shaft 11 causes the sprocket wheel 13 which is integrally connected therewith to rotate at the same speed and in the same direction. However, since the sprocket wheel 14 which is, operatively connected with the sprocket wheel 13 by chain means 15, is fixed against any rotation, the rotative force or torque acting on the intermediate shaft 11 acts to cause the support arm 4 to rock in a counterclockwise direction as viewed in FIG. 2, and at a speed higher than the speed at which the brush carrying arm 2 is rocked by the moving vehicle V.

To summarize, according to the present invention, the side washing brush 6 is operatively supported so that, when the brush is pushed aside by the moving vehicle V causing rocking movement of the brush carrying arm 7, the support arm 4 is caused at all times to rock promptly in a direction different from that of movement of the body of the moving vehicle. This means that, according to the present invention, the washing brush unit can be supported with a sufficient reach to operate effectively on the body of any small vehicle for efficient washing operation without the danger that the brush unit may be caught on or locked to the front end of the vehicle body, thus making it possible to provide a car washer which is capable of washing the surfaces of a vehicle efficiently without any inconvenience regardless of the size of the vehicle.

While one preferred embodiment of the present invention has been shown and described, it will be apparent to those skilled in the art that many changes and modifications may be made therein without departing from the scope and spirit of the invention as defined in the appended claim.

What is claimed is:

1. A brush supporting device for a car washer, comprising: a support arm pivotally mounted on a frame of the car washer, a shaft journaled in the free end of said support arm, a brush carrying arm extending from said shaft laterally thereof and formed integral therewith, a washing brush suspended from said brush carrying arm, a motion-transmitting wheel fixedly mounted on said shaft, another motion-transmitting wheel fixedly mounted on the washer frame in axial alignment with the pivotal axis of said support arm, and an overspeed transmission mechanism connected between said motion-transmitting wheels for rocking said support arm in response to rocking movement of said brush carrying arm at a speed higher than that of the latter.

* * * * *